United States Patent
Chavez, Jr.

[11] 3,881,745
[45] May 6, 1975

[54] VEHICLE OCCUPANT RESTRAINT DEVICE
[76] Inventor: Evelio F. Chavez, Jr., 211 S.W. 55th Ave., Miami, Fla. 33134
[22] Filed: June 19, 1974
[21] Appl. No.: 480,691

[52] U.S. Cl. ........................................... 280/150 SB
[51] Int. Cl. ........................................... B60r 21/10
[58] Field of Search .............................. 280/150 SB

[56] References Cited
UNITED STATES PATENTS
| | | | |
|---|---|---|---|
| 3,684,310 | 8/1972 | Weststrate | 280/150 SB |
| 3,770,078 | 11/1973 | Keppel | 280/150 SB |
| 3,781,034 | 12/1973 | Botnick | 280/150 SB |

*Primary Examiner*—Robert R. Song

[57] ABSTRACT

A restraining safety belt arrangement including a first belt having one end fixed to an inboard portion of the roof of a vehicle and a second end, fixed relative to the floor of the vehicle, generally in vertical alignment with said first end; and a second belt having a first end, fixed relative to a slide buckle, slidably engaged along an intermediate portion of the first belt, and a second end fixed relative to a conventional inertia type of belt retractor reel, carried in a housing which travels horizontally along the inside of the vehicle door, adjacent the lower edge thereof, when the vehicle door is opened or closed. Suitable track means are provided to guide the housing, enclosing the retractor reel. When the vehicle door is opened, the first and second belts move to positions permitting unobstructed entry into or exit from the vehicle; when the door is closed, the first belt engages up and over the inboard shoulder of an occupant and the second belt engages over the lap area of the occupant, lock means prevents disengagement of the belts upon rapid deceleration and safety means are provided to prevent said disengagement in the event of door opening as the result of an accident. Emergency release means permits removal of the belts from the occupant's shoulder and lap areas to permit rapid exit from the vehicle if necessary with the doors closed.

17 Claims, 12 Drawing Figures

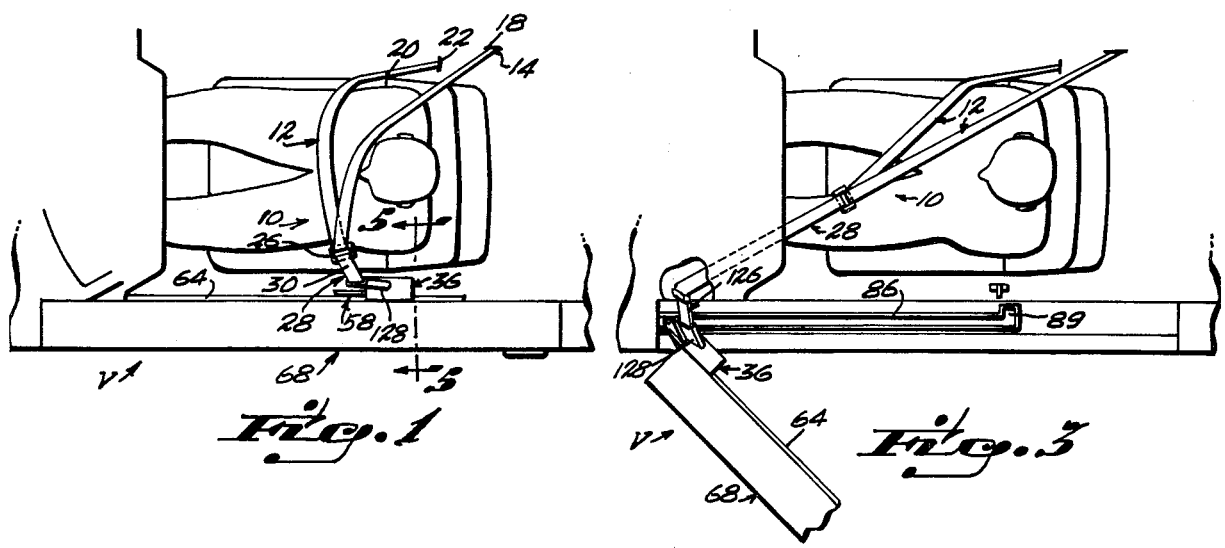
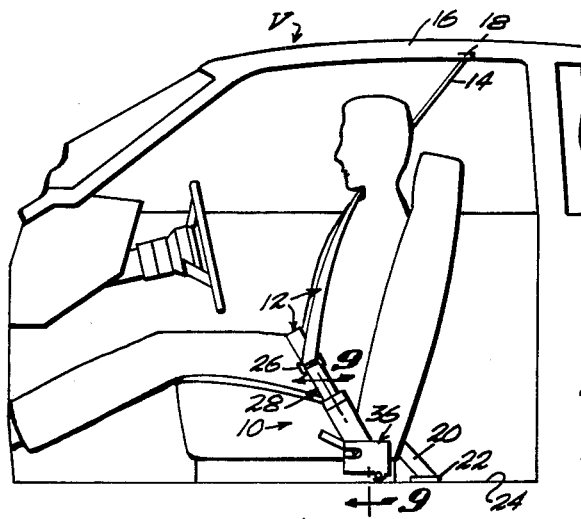
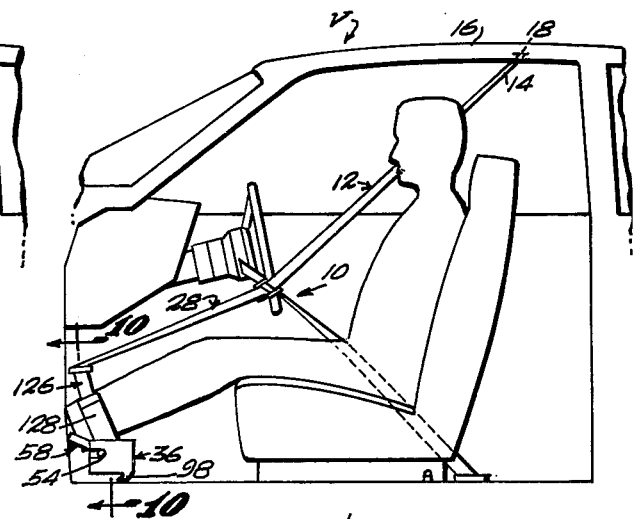
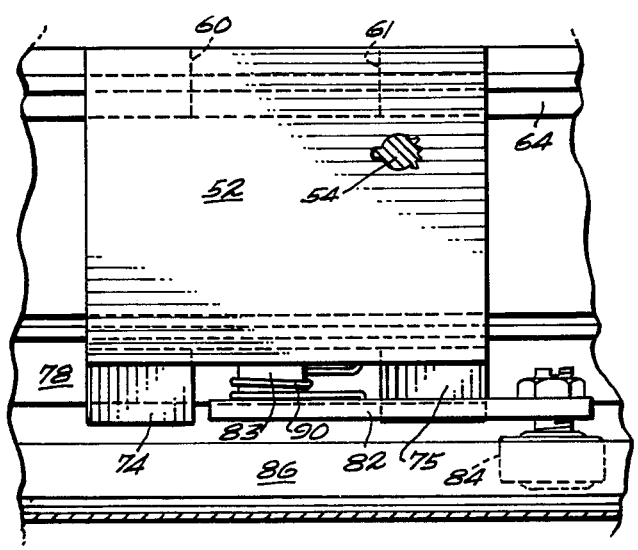
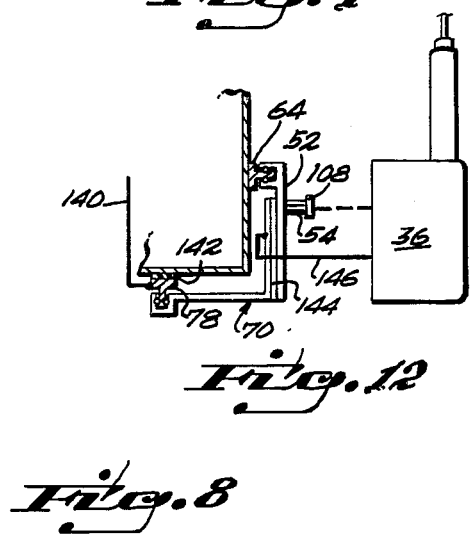

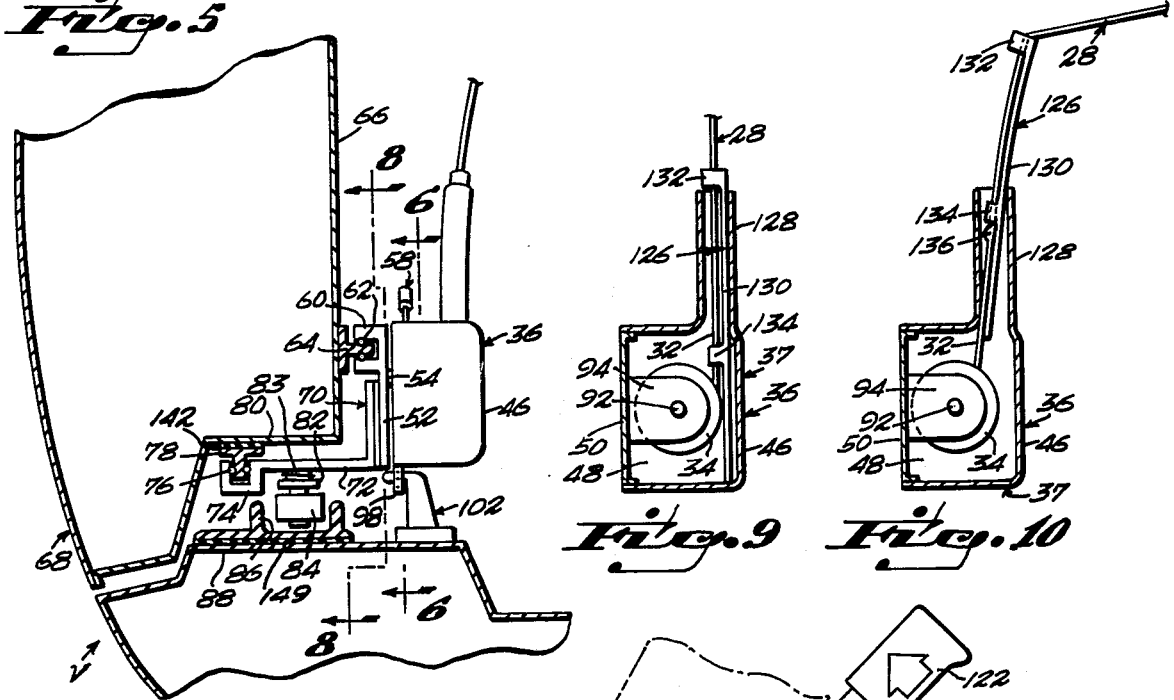

3,881,745

VEHICLE OCCUPANT RESTRAINT DEVICE

FIELD OF THE PRESENT INVENTION

The present invention pertains to a vehicle occupant restraint device incorporating a shoulder harness and a lap belt to maintain a vehicle occupant in a generally normal seated position in the event of an accident. In addition, the device permits unobstructed entry into or exit from the vehicle with the door open, and automatically engages the shoulder harness and lap belt about the occupant when the vehicle door is closed.

OBJECTS AND ADVANTAGES OF THE PRESENT INVENTION

One of the principal objects of the present invention is to provide a vehicle occupant restraint device which automatically applies a shoulder harness belt and a lap belt in secured engagement about the occupant when the door of the vehicle is closed, and simultaneously disengages both belts from the occupant and moves them to extended positions to permit unobstructed exit from the vehicle with the door open. Therefore, unobstructed entry into the vehicle is also provided by opening the door.

Another principal object of this invention is to provide a restraint device, actuated by its fixed, sliding engagement along the inside of the vehicle door, when said door is opened or closed, and which includes a first safety means which prevents accidental disengagement of both belts in the event of an accident resulting in the door being opened.

A further object of the instant invention is to provide track means which slidably engages and controls the movement of a housing, containing a conventional inertia type of seat belt, in a horizontal plane adjacent the lower edge of the door.

Yet another object of the present invention is to provide a second safety means, controlled by the vehicle occupant, to disengage the first and second belts, for example, after the vehicle door is jammed closed in an accident.

BRIEF DESCRIPTION OF THE DRAWINGS

FIG. 1 is a diagrammatic top plan view of the driver's compartment of a vehicle with an occupant seated therein and a restraint device in accordance with the present invention engaged about said occupant, the door being in a closed position;

FIG. 2 is a side elevational view of FIG. 1, the door being omitted for illustration purposes, but with the various elements of the invention being illustrated in a door closed position;

FIG. 3 is a view, similar to FIG. 1, with the door in an opened position;

FIG. 4 is a side elevational view of FIG. 3;

FIG. 5 is a vertical sectional view taken along the line 5—5 of FIG. 1;

FIG. 6 is a vertical sectional view taken along line 6—6 of FIG. 5;

FIG. 7 is a fragmentary sectional view, similar to FIG. 6, illustrating a locked position of the reel housing;

FIG. 8 is a vertical sectional view taken along line 8—8 of FIG. 5;

FIG. 9 is a generally vertical sectional view taken along the line 9—9 of FIG. 2;

FIG. 10 is a generally vertical sectional view taken along the line 10—10 of FIG. 4;

FIG. 11 is a side elevational view of the anchor means for the reel housing lock in the door closed position; and FIG. 12 is a schematic illustration of the electrical interlock from the starter motor to the device of the present invention.

DETAILED DESCRIPTION OF THE DRAWINGS

With reference to the drawings in which like reference numerals designate like or corresponding parts throughout the various views, and with particular reference to FIGS. 1 and 2, the vehicle occupant restraint device of the present invention is indicated generally at 10 and includes a first belt 12 having a first end 14 anchored in any conventional manner to an inboard portion of the vehicle roof 16 as at 18, and a second end 20, similarly anchored at 22 to an inboard portion of the vehicle floor 24. Intermediate its length, the first belt 12 passes through an aperture in a sliding buckle 26.

A second belt 28 has a first end 30 fixed to said sliding buckle 26 and a second end portion 32, FIGS. 9 and 10, convolutely wound around a conventional inertia type of retractor reel 34, rotatably mounted in a reel housing 36. The reel housing 36 comprises a main body portion 37, formed by end walls 38, 40, top and bottom walls 42, 44 and an inside wall 46, defining an inner chamber 48. An outside wall 50, fixed relative to the chamber opening, forms a closure for the housing 36. As best illustrated in FIGS. 5 and 6, the housing 36 is pivotally attached to a mounting plate 52 by a headed pin 54, rigidly fixed to said mounting plate 52. The housing 36 is slidably engaged with the pin 54 through a slot 56, extending rearwardly a predetermined distance through the outside wall 50 and is held thereon by an emergency release lever 58, engaged about the front portion of the pin 54 in a manner to be subsequently described.

With reference to FIGS. 5, 6 and 8, the mounting plate 52 includes a pair of upper, horizontally extending yoke portion 60 and 61, containing a plurality of ball bearings 62 for free rolling engagement along a T-rail 64, fixed horizontally along the inside wall 66 of the side door 68 of the vehicle V. An angle bracket 70 is fixed to the outside of the plate 52, providing a lower, outwardly extending flange 72 terminating in a pair of upwardly opening yoke portions 74 and 75, containing a plurality of ball bearings 76 for free rolling engagement along a T-rail 78, fixed horizontally along the bottom wall 80 of the side door 68. The T-rails 64 and 78 are parallel and provide for free movement of the reel housing 36 along the main length of the inside of the door 68. Intermediate the length of the leg 72, a roller arm 82 is pivotally attached thereto at 83 at one end as best illustrated in FIGS. 5 and 6. The extended end of the arm 82 adjustably carries a downwardly extending roller 84, engaged in a track 86, fixed in any conventional manner along the top surface of the door sill 88. A shock absorber spring 90 connects between the leg 72 and the roller arm 82. Track 86 terminates at its rear end in an inwardly turned recess 89, FIG. 3, to receive the roller 84 in the closed door position.

As illustrated in FIGS. 6 and 7, the retractor reel 34 is rotatably mounted at 92 between a pair of end plates 94 and 96, fixed to the inner surface of the outside wall 50. The reel 34 is of the conventional type which locks when the weight of the occupant engaged by the belt is suddenly thrust against said belt by a rapid deceleration in the speed of the vehicle. When such a rapid deceleration occurs, the thrust against the locked belts 12 and 28 causes the reel housing 36 to rotate clockwisely as seen in FIGS. 6 and 7 causing a hook 98 formed downwardly from the bottom rear end of the outside housing wall 50 to engage in a notch 100 of an anchor member 102, bolted at 104 to the door sill 88. The anchor member 102 is positioned to permit the hook 98 to pass over the outwardly projecting end 106 of the anchor member 102 when the reel housing 36 is moved to the position, illustrated in FIGS. 1 and 2 when the vehicle door 68 is closed. Any rapid deceleration of the vehicle causes the rotational movement of the housing to lock the hook 98 in the notch 100.

The pivot pin 54 provides an inner, break-away head 108, FIG. 12 lying against the inside face of the emergency release lever 58 which is pivoted at 110 to the outside wall 50, FIGS. 6 and 7. A ratchet engagement 112 is provided between the front portion of the pivot pin 54 and the inner lever arm portion 114. Oppositely extending from the ratchet engagement, a key 116 rides in an arcuate extension 118 of the pin passage hole 120 in wall 50. In an emergency, the hook, 98 can be disengaged from the notch 100 by upward, counterclockwise movement of the outwardly extended handle portion 122 of lever 58.

The pin head 108 is constructed to break away in the event of an accident in which the door 68 opens, thereby allowing the reel housing to remain locked to the anchor 102 as previously described. However, manual actuation of the release lever 58 to rotate the reel housing 36 a limited amount, determined by the arcuate extension 118, will release the reel housing 36.

A spring 124 engaged around the pivot 110 and connecting between the lever arm 114 and the outer wall 50 normally urges the reel housing 36 toward the unlocked position of FIG. 6.

With reference to FIGS. 9 and 10, a telescopic belt guide 126 normally resides in a belt exit tube 128 extending upwardly from the reel housing 36, said guide comprises a generally vertically extending, elongated, plate 130 with upper and lower belt guide loops 132 and 134. A thickened belt area 136 is adapted to engage the lower guide loop 134 and to move the plate 130 partially outwardly of the exit tube when the second belt 28 is fully extended as in FIGS. 3 and 4. In this manner the belts 12 and 18 are elevated to a substantial degree to permit easy entrance into and exit form the vehicle V, under said belts.

Referring to FIG. 12 a negative lead 140 from the vehicle's starter motor relay connects to the bottom rail 78 which is insulated from the door at 142; from the rail 78 current is conducted through the angle bracket 70 to the reel housing 36, the bracket 70 being insulated from the mounting plate 52 at 144. Lead 146 connects to the reel housing 36 from said bracket 70. The reel housing 36 is grounded to the vehicle door through the pin 54, mounting plate 52, and inside rail 64. Track 86 is insulated from the door sill 88 as at 149. Therefore, the motor of the vehicle V cannot be started when the retractor reel housing 36 is separated from the mounting plate 52. The vehicle motor can be started with the door open or closed. Only the separation of the housing 36 and plate 52 by rupturing the breakaway pin head 108 will break the electrical connection to the starter motor.

When the door 68 is closed and the reel housing 36 has been rotated to engage the hook 98 in the notch 100, a spring loaded detent pin 150, carried in the anchor 102, is positioned to engage in a detent recess 152 in the hook 98 to lock the two elements together.

What is claimed is:

1. A vehicle occupant restraint device for use in combination with a vehicle body defining an occupant compartment providing a seat therein, accessible through a side opening and a side door having a forward, generally vertical edge, pivoted to the vehicle body to mount the door for movement between open and closed positions relative to the side opening, said restraint device comprising;
   A. a first belt having a first end, fixed relative to an inboard portion of the vehicle roof and a second end, fixed relative to an inboard portion of the vehicle floor;
   B. a second belt having a first end, fixed relative to a slide buckle, slidable engaged along an intermediate portion of said first belt, and a second end fixed to a belt retractor reel of the type which locks the belt against retraction upon rapid deceleration of the vehicle, said first belt being positioned to normally pass over the inboard shoulder of the occupant and said second belt being positioned to engage over the lap of the occupant;
   C. a main housing providing an interior chamber rotatably mounting said retractor reel;
   D. rail means, fixed longitudinally along the bottom portion of the door for engagement by follower means, carried by said housing, to cause said housing to move longitudinally to a position adjacent the lower front, pivoted edge of the door when said door is open to disengage said first and second belts, respectively, from the shoulder and lap areas of the occupant to provide unobstructed exit from the vehicle, and to cause said housing to move rearwardly to a position to re-engage said first and second belts, respectively, with the shoulder and lap areas of an occupant when said door is closed;
   E. a first safety means to automatically prevent accidental disengagement of said first and second belts from the occupant in the event of an accident resulting in the door being opened; and
   F. a second safety means, controllable by the vehicle occupant to disengage said first and second belts to provide for an emergency exit from the vehicle.

2. A vehicle occupant restraint device as defined in claim 1 wherein said main housing comprises front, back, top, bottom and inside walls, defining said interior chamber, and an outside wall, fixed in closing relation to said chamber.

3. A vehicle occupant restraint device as defined in claim 2 including a mounting plate, pivotally connected to said main housing and carrying said follower means.

4. A vehicle occupant restraint device as defined in claim 3 wherein said pivotal connection comprises a pin fixed to said mounting plate and extending inwardly through said outside wall with a headed inner end to normally maintain said main housing in pivotal engagement therewith.

5. A vehicle occupant restraint device as defined in claim 4 wherein said headed inner end is constructed to break away in the event of accidental opening of the vehicle door.

6. A vehicle occupant restraint device as defined in claim 5 wherein said first safety means comprises an anchor means, fixed rigidly to the sill of the door opening and a hook, extending downwardly from said outside wall which lockingly engages said anchor means upon rapid deceleration of the vehicle to maintain said main housing in place in the event of the door opening as a result of an accident.

7. A vehicle occupant restraint device as defined in claim 6 wherein said anchor means includes a generally vertical post, fixed to the sill and a generally horizontal, outwardly extending arm providing an upwardly extending notch for locking engagement by said hook.

8. A vehicle occupant restraint device as defined in claim 7 wherein said second safety means comprises a manually actuated spring loaded lever, pivotally connected interiorly of said chamber, between said outside wall and break away head, rearwardly of said pivotal connection, and including a forward ratchet connection to said pivotal connection to disengage said hook from said notch by proper manual actuation of an outwardly extending handle portion of said lever to cause a counterclockwise rotational movement of said main housing to disengage said hook from said notch.

9. A vehicle occupant restraint device as defined in claim 8 including a key extending outwardly from the rearward portion of said pivot, engaged in a segmental, arcuate hole in said outside wall to limit the rotational movement of said main housing by actuation of said lever.

10. A vehicle occupant restraint device as defined in claim 3 including an angle bracket, fixed to said mounting plate, providing a lower, outwardly extending flange.

11. A vehicle occupant restraint device as defined in claim 10 wherein said rail means includes a first rail positioned upwardly of the inner bottom edge of the door and a second rail, fixed along the bottom wall of the door.

12. A vehicle occupant restraint device as defined in claim 11 wherein said follower means comprises yoke shaped followers formed integral with the top edge of said mounting plate and outer end of said flange to respectively straddle said first and second rails with ball bearing interposed therebetween.

13. A vehicle occupant restraint device as defined in claim 7 including a spring loaded detent means to maintain said anchor means in engagement with said hook.

14. A vehicle occupant restraint device as defined in claim 10 including a spring loaded arm pivotally connected at a first end to the underside of said outwardly extending flange and carrying a roller at the second end thereof, engaged in a track fixed along the top of the door sill.

15. A vehicle occupant restraint device as defined in claim 14 including an inwardly turned rear end portion of said track to receive the roller at the extent of travel of said main housing.

16. A vehicle occupant restraint device as defined in claim 1 including a telescopic belt guide in a belt exit tube extending upwardly from the front end of the reel housing.

17. A vehicle occupant restraint device as defined in claim 16 wherein said belt guide compirses a generally vertically extending, elongated plate with upper and lower belt guide loops, said second belt extending through said loops and including a thickened portion to move said guide partially upwardly, outwardly of said tube when said second belt is fully extended by the full opening of the vehicle door.

* * * * *